United States Patent

Niese

[15] 3,673,664
[45] July 4, 1972

[54] LOCATING DEVICE
[72] Inventor: William F. Niese, Toledo, Ohio
[73] Assignee: Libbey-Owens-Ford Company, Toledo, Ohio
[22] Filed: May 6, 1970
[21] Appl. No.: 35,024

[52] U.S. Cl. ......................... 29/203 P, 29/203 MW, 228/44, 269/2, 269/43, 269/254 R
[51] Int. Cl. ................. B23p 19/04, B23p 3/20, B23k 37/04
[58] Field of Search ..................... 228/44; 269/1, 2, 43, 254; 29/203 MW, 203 P; 65/149

[56] References Cited

UNITED STATES PATENTS

| | | | |
|---|---|---|---|
| 3,540,718 | 11/1970 | Heffron | 269/254 R |
| 2,960,953 | 11/1960 | Schneider | 269/1 |
| 3,173,677 | 3/1965 | Guyot | 269/254 D |
| 3,452,976 | 7/1969 | Ross | 269/254 X |
| 2,815,813 | 12/1957 | Goldberg | 269/2 |
| 2,798,146 | 7/1957 | November | 228/44 X |
| 3,374,140 | 3/1968 | Dunsmore | 269/254 X |

*Primary Examiner*—Wayne A. Morse, Jr.
*Attorney*—Collins and Oberlin

[57] ABSTRACT

A relatively inexpensive locating device by which electric connector elements or bus bars can be attached to electrode on a glass sheet. Specifically, such locating devices can be employed to advantage during the location and soldering of the connector elements along the opposite sides of the glass sheet to conduct electrical energy to a plurality of fine metal lines fused to the glass and serving to heat the same.

3 Claims, 4 Drawing Figures

PATENTED JUL 4 1972
3,673,664
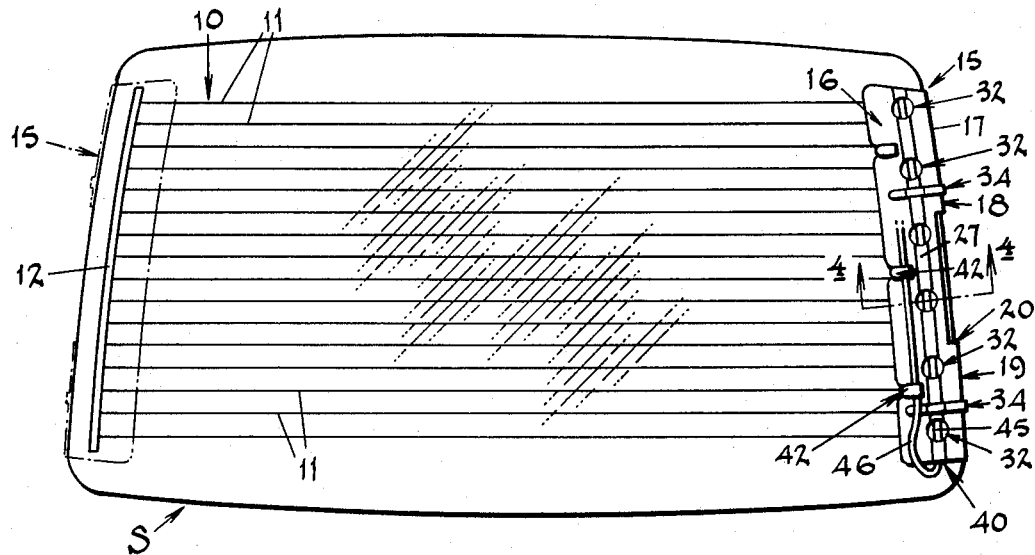
Fig. 1.
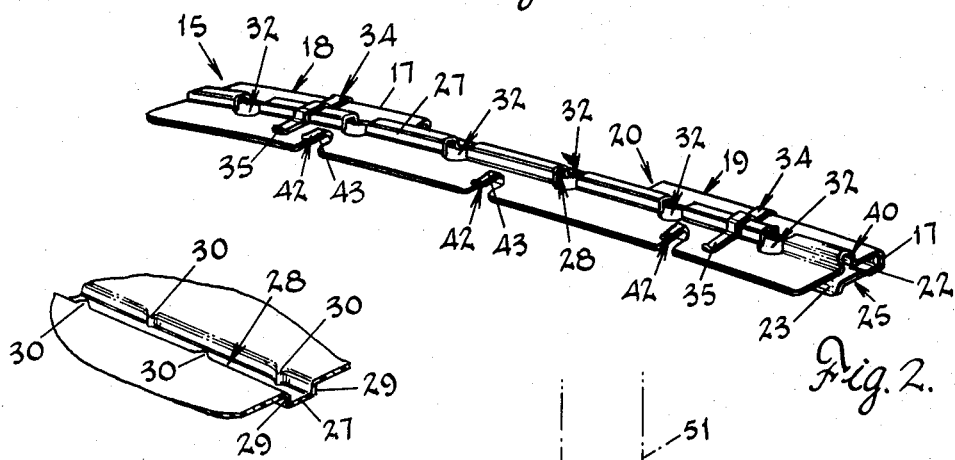
Fig. 2.
Fig. 3.
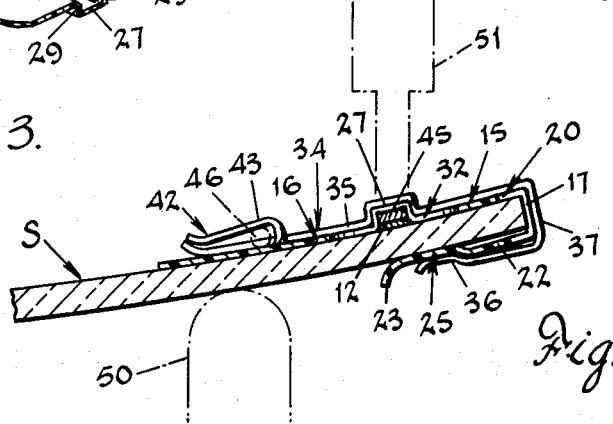
Fig. 4.
INVENTOR.
William F. Niese
BY Collins & Oberlin
ATTORNEYS

LOCATING DEVICE

FIELD OF THE INVENTION

The locating device herein to be described has utility in the soldered assembly of connector elements to a glass sheet adapted to be electrically heated. Use of such sheets is a present-day innovation for glazing the window openings of an automobile to maintain optical clarity. This is of particular importance with regard to the rear window through which the driver, or other occupants of the car, can observe following traffic. The provision of means for heating the glass of a rear auto window serves to remove moisture, snow or ice thereby to maintain the same substantially transparent for driving safety. Such heating of the glass is accomplished by a grid of electrically conductive elements, in the form of exceedingly fine lines or stripes, arranged in substantially parallel relation to one another across the expanse of the inner surface of the window and integrally connected at their ends to electrodes. The connector elements, that are later to be connected to the electrical system of the automobile, are placed on the electrodes in spaced relation to the margins of opposite sides of the glass sheet by the locating devices preparatory to the soldering operation.

SUMMARY OF THE INVENTION

This invention relates broadly to the location of one part preparatory to attachment to a second part and more particularly to an improved locating device with means for releasably holding said one part to position the same in exact registry with an area of the second part.

An important object of the invention resides in the provision of an improved locating device of a rigid plastic material with a channeled rib in which a connector element can be held while being located with reference to the edge of a sheet of material.

Another object of the invention is to provide a locating device of the above character which is formed for relatively simple handling and adapted to formation by inexpensive, mass-production methods.

Other objects and advantages of the invention will become more apparent during the course of the following description when read in connection with the accompanying drawings.

In the drawings wherein like numerals are employed to designate like parts throughout the same:

FIG. 1 is a view of a glass sheet having an electrical heating gridwork on one surface thereof;

FIG. 2 is a perspective view of a locating device as constructed in accordance with the invention;

FIG. 3 is a fragmentary perspective view of the under side of the device; and

FIG. 4 is a detail view of the locating device as taken on the plane of line 4—4 of FIG. 1.

DETAILED DESCRIPTION OF THE INVENTION

With reference now to FIG. 1 of the drawings, there is shown a glass sheet S provided on one surface with electrical gridwork designated by the numeral 10 and including fine metal lines or stripes 11 and oppositely disposed electrode areas 12. The conductive lines 11, in parallel relation to one another, and the electrode areas are usually of a material, such as a silver frit, that can be applied by silk-screen or like processes on one surface of the sheet of glass while the same is substantially flat. During subsequent treatment of the sheet to heat and bend the same to the desired curvature, the frit material becomes fused and fully bonded to the glass surface. When the sheet has cooled to room temperature, flexible bus bars, as of a wire braid, are attached to the electrode areas by soldering and with "pigtail" extensions for eventual connection through a suitable switch to the electric system of the automobile. When practicable, the soldering operation is carried out on apparatus equipped with pluralities of soldering irons. To positively locate the bus bars with reference to the electrode areas preparatory to the soldering operation, a relatively novel expedient has been found in the device of this invention.

As viewed in FIG. 2, such a device, generally designated by the numeral 15, is formed of a thin gauge, though stiff, plastic material. Preferable plastic materials are selected from those varieties that are resistant to the high temperatures required for soldering as well as not being susceptible to sticking by the solder. Moreover, they should be of suitably transparent or semi-transparent plastic materials for easy location of the device.

The locating device 15 has a substantially flat or planar body 16 with a depending side wall 17. Normal continuity of the side wall 17 is interrupted to reduce the contacting surface area thereof when brought into engagement with the edge of a glass sheet. To this end, the side wall 17 actually includes wall sections 18 and 19 with an intervening open area 20 therebetween. Each side wall section 18 or 19 has a flange 22 formed with a downwardly curved edge 23, that projects inwardly beneath the body portion 16. This provides a J-shaped formation 25 by which the flanges 22 can be inserted over the edge of a glass sheet to temporarily secure the device. The body portion 16 is formed with a rib 27 directed upwardly from its upper surface to form a channel 28 in the under surface in which the bus bar can be placed. As viewed in FIG. 3, the inner surfaces of the walls 29 of the rib 27 are provided with integral protrusions of ridges 30 that are adapted to engage the sides of the bus bar to retain the same in the channel 28. Regularly spaced between the ends of the body portion, a plurality of substantially circular openings 32 are included to permit passage of the soldering irons through the locating device and into contact with the braid body of the bus bar. These openings, of course, are located according to the desired areas for attachment to the electrode areas.

To stabilize gripping of a glass sheet between the body portion 16 and the flanges 22, at least two U-shaped clamping members 34, of a thin metal formation, are shaped to the configuration of the device. As best seen in FIG. 4, the leg portion 35 overlying the body portion 16, and a relatively shorter leg portion 36 acting on the flanges 22 of each of the side wall sections 18 and 19 and through the bight portion 37, cooperate to urge the body portion 16 and flanges 22 into relatively fixed or stabilized contact with the sheet.

At one end of the device, the channel is formed to provide restricted outer end 40 and terminate the channel 28. In assembling a bus bar into the channel of the locating device, a pigtail extension is brought out through the open end 40 and fixed beneath clips 42 integrally formed with the body portion. Each clip provides a finger 43 to flexibly hold the pigtail.

With reference to FIG. 1, one locating device 15 is illustrated in broken line on one side of the glass sheet and arranged over an electrode area 12. An oppositely disposed locating device 15, shown in full line, illustrates the position of a bus bar 45 with the associated pigtail 46 held by the clips 42. As further viewed in FIG. 4, the marginal portion of the sheet is firmly received in the J-shaped formation 25 and with the body portion 16 overlying the upper surface of the sheet. Although not restricting the utility of this invention to any specific embodiment of soldering apparatus, it is suggested, by way of example, that the sheet be mounted at its oppositely disposed sides on support members 50, such as the one indicated in broken line. Now, according to the desired mode of operation, the sheet can be raised, or one or more soldering irons 51 indicated in broken line, lowered to bring each tip through an opening 32 and into contact with the braid body of the bus bar to which a soldering flux has been applied. The actual supplying of solder at the juncture of the soldering tip and bus bar will be understood to be made in any suitable manner. When the sheet is removed from the vicinity of the soldering irons, the pigtails 46 are withdrawn from beneath the clips 42 and the locating device then bodily taken from the margin of the sheet.

Since the locating device is adapted to be made by relatively inexpensive, mass-production methods, it readily lends itself to low-cost consideration either with a view to continued reuse or disposal after each soldering operation.

I claim:

1. In apparatus for producing electrically heated automotive windows that comprise a sheet of glass with a conducting gridwork on a surface thereof including an electrode extending along one margin and a flexible bus bar soldered to said electrode and having a connecting pigtail extending loosely from one end, the improvement in means for soldering said bus bar to said electrode comprising means for supporting said bus bar and engageable with said sheet to locate and retain said bus bar in soldering relation to said electrode, said supporting means being generally U-shaped in transverse cross-section to permit the same to slide over an edge of said sheet and into engagement with adjacent margins on opposite surfaces thereof, a channel in one leg of said supporting means for retaining said bus bar between said leg and said sheet, a series of openings in the channel to expose said bus bar at predetermined points along its length for simultaneous soldering engagement with a plurality of soldering irons, and at least two generally U-shaped clamping members mounted in surrounding relation to said supporting means to resiliently urge the same into contact with the marginal portions of the glass sheet.

2. Apparatus as defined in claim 1, in which said supporting means includes means for supporting said pigtail in substantially parallel relation to said bus bar while separating it from said bus bar and from said sheet.

3. In apparatus for producing electrically heated automotive windows that comprise a sheet of glass with a conducting gridwork on a surface thereof including an electrode extending along one margin and a flexible bus bar soldered to said electrode and having a connecting pigtail extending loosely from one end, the improvement in means for soldering said bus bar to said electrode comprising means for supporting said bus bar and engageable with said sheet to locate and retain said bus bar in soldering relation to said electrode, said supporting means being generally J-shaped in transverse cross-section to permit the same slide over an edge of said sheet and into engagement with adjacent margins on opposite surfaces thereof, an inwardly opening channel in the longer leg of said supporting means for retaining said bus bar between said leg and said sheet, a series of openings in the channel to expose said bus bar at predetermined points along its length for simultaneous soldering engagement with a plurality of soldering irons, a plurality of clips formed in the surface of said longer leg for supporting said pigtail substantially parallel with but in spaced relation to said bus bar, and at least two channel shaped clamping members mounted in surrounding relation to said supporting means to resiliently urge the same into contact with the marginal portions of the glass sheet.

* * * * *